June 11, 1957 C. C. CUTLER 2,795,698

FREQUENCY SWEPT PULSE GENERATOR

Filed July 6, 1954

INVENTOR
C. C. CUTLER
BY Arthur J. Torsiglieri
ATTORNEY

United States Patent Office 2,795,698

Patented June 11, 1957

2,795,698

FREQUENCY SWEPT PULSE GENERATOR

Cassius C. Cutler, Gillette, N. J., assignor to Bell Telephone Laboratories, Incorporated, New York, N. Y., a corporation of New York Application July 6, 1954, Serial No. 441,203

8 Claims. (Cl. 250—36)

This invention relates to frequency-swept pulse generators, and more particularly to frequency-swept pulse generators of the regenerative type.

In certain forms of pulse communication systems it is advantageous to operate with frequency-swept pulses, that is, pulses in which the instantaneous frequency of each pulse changes during the time of the pulse. In such a system the receiver can be made responsive only to information contained in a pulse train having each pulse frequency swept in a predetermined fashion. A further advantage of this type of operation is an increase in effective range occasioned by more lenient signal-to-noise requirements in the receiver. The characteristics of the receiver can be made such as to provide different phase shifts to different frequency components and therefore to effect energy concentration of pulses having a given frequency distribution, whereas electrical interference in the form of noise having its frequency components distributed in a random nature will not experience this effect. This will result in a peaking of the energy contained in a pulse which is frequency-swept in a predetermined fashion with a consequent discrimination against interference from noise and pulses of other frequency characteristics.

Various arrangements have been employed hitherto to produce frequency-swept pulses. One expedient has been to employ injection-type magnetrons which are pulsed with a triangular shaped wave form to provide a change in the frequency of oscillation during the time the magnetron is generating an R.-F. pulse, thus obtaining a frequency-swept pulse. Another method is to generate an R.-F. pulse having a plurality of frequency spectrum components and pass the pulse through a phase dispersive network which operates to arrange its frequency components in a desired phase relationship thereby providing a frequency-swept pulse. However, use of the latter method has been limited since the phase dispersive network required to provide sufficient dispersion usually becomes unwieldy when frequency sweeping over a wide range is desired. Furthermore, this method requires generating an original pulse of high peak power and short duration which in some cases is impractical.

It is a principal object of the present invention, therefore, to improve systems which utilize frequency-swept pulses.

A further object of the present invention is to generate linearly swept pulses by use of a generator which is relatively simple in structure and efficient in operation.

To this end, a feature of the present invention is the use of a pulse generator having a regenerative loop circuit which includes a phase dispersive network such that by repeated traversals around the loop the circulating pulses become progressively more frequency-modulated.

In an illustrative embodiment of the present invention a pulse generator circuit including a phase dispersive element is greatly simplified by utilizing a regenerative circuit in which a pulse may circulate indefinitely under equilibrium conditions. These equilibrium conditions are such as to provide a desired pulse repetition rate and amplitude as well as a desired distribution of the frequency components of each pulse appearing at the output of the regenerative circuit. Accordingly, the circulating pulse generator of the invention includes an amplifier having a regenerative feedback circuit which introduces a delay equal to the desired interval between successive pulses in the pulse train to be generated. The feedback circuit also includes a phase dispersive network to obtain a desired phase distribution of the frequency spectrum components of each pulse. On passing through the phase dispersive network the various frequency components of wave energy which make up the pulse acquire different phase shifts as a function of the frequency of each. By imparting to the components of the circulating pulse a phase shift which is a function of frequency the various frequency components of the pulse add to give the desired characteristics as a function of time. Also included in the feedback loop is an expander which has amplitude response characteristic complementary to the combined amplitude effects of the characteristics of the remaining elements in the loop on the instantaneous pulse amplitude and therefore affords stable operation. An automatic gain control circuit is also provided to maintain an overall loop gain of unity at the desired pulse amplitude. By repeatedly traversing the loop the pulse becomes progressively more frequency modulated, since it passes through the dispersive network on each traversal, until the action of the remaining elements in the loop compensates for any further modulation, thereby affording stability of the loop. In this manner, frequency modulated pulses are generated and circulate through the regenerative loop continuously.

A principal advantage of the present invention is a reduction in the complexity of the apparatus required. A much smaller phase dispersive network is required than in previous systems since the network is traversed innumerable times by the circulating pulse. Efficiency of operation is occasioned by the faculty of providing a greater degree of modulation than previous systems for a given dispersive element. Moreover, extremely linear frequency-modulated pulses can be obtained from the present invention.

The above and other features and objects of the invention will become apparent by referring to the following description taken in connection with the accompanying drawings, in which.

Figure 1:
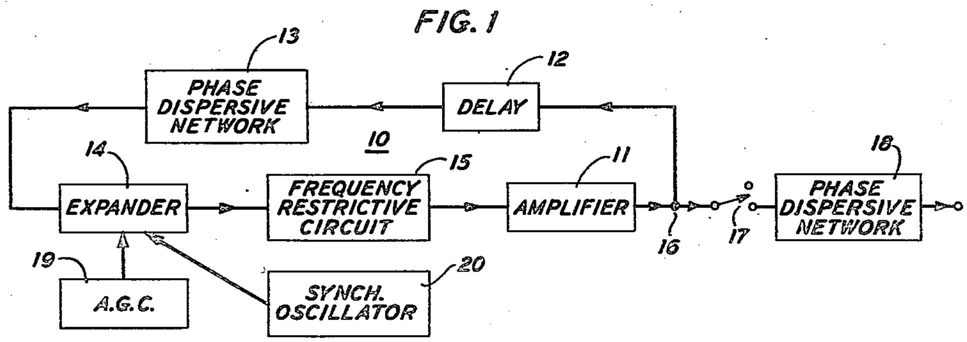
Fig. 1 is a block diagram of a frequency-swept pulse generator according to the invention.

Referring now more particularly to the drawings, Fig. 1 illustrates the basic regenerative pulse generator of the invention. The pulse generator chosen for purposes of illustration is of the type disclosed in my Patent 2,617,930 which issued November 11, 1952. As explained therein the blocks designated as the amplifier 11, delay unit 12, expander 14, and frequency restrictive circuit 15 which are serially connected to form a regenerative feedback loop 10 provide the separate functions of amplification, delay, expansion, and frequency restriction. It will be understood, however, that certain of these functions may be combined in a single element, an example being a delay line with frequency restrictive characteristics, and that other functions such as the delay required in the loop circuit may be distributed either in part or completely throughout the circuit. The loop circuit of my aforementioned patent includes an amplifier, the output of which is applied through a delay unit, expander, and frequency restrictive circuit to the input of the amplifier. To this regenerative loop has been added a phase dispersive network 13 as shown in Fig. 1. Pulses may be introduced into or abstracted from the loop circuit at any convenient point, the output being shown in Fig. 1 at 16 as a matter of convenience.

Consider the case of an alternating signal burst of energy, the envelope of which describes a pulse. This alternating signal burst of energy which is generally referred to as a radio-frequency pulse may be considered as a spectrum of individual continuous wave signals which may be expressed by Fourier analysis to give the shape of the pulse envelope. The "center frequency" of the pulse signifies the mean frequency of the Fourier spectrum and the spectrum of frequencies contained in any pulse is a function of the characteristics of the parameters in the pulse circuit. The term "instantaneous frequency" as used herein refers to the reciprocal of the time between corresponding parts of a single frequency cycle in the pulse.

A radio frequency pulse which appears in the circuit of Fig. 1, when traversing the phase dispersive network 13 has its frequency components phase shifted an amount which is a function of frequency of each. This results in a frequency sweeping of the pulse and an elongation of the pulse envelope. The pulse then passes to the amplifier 11 through an expander 14 and a frequency restrictive circuit 16. The pulses are sharpened in passing through the expander 14 by the action of the expander in providing greater amplification for large amplitude signals than for small amplitude signals. In the frequency restrictive circuit, which actually represents the frequency characteristics of all of the elements in the loop, plus any frequency restrictive circuit which is introduced to define the range of frequency components contained in the pulse, the frequency components furthest from the center frequency are attenuated to some extent and the remaining frequency components recombined to form an output pulse which is longer than the input pulse. This output pulse is amplified in amplifier 11 and is reapplied after a delay introduced by delay-unit 12 to the input of phase dispersive network 13 to reinitiate the cycle. The total delay in the loop is made equal to the desired interpulse interval and the amplifier provides sufficient gain to compensate for the attenuation introduced in the loop.

It will be observed that the response of the expander 14 is complementary to the effect of the frequency restrictive circuit 15 and the phase dispersive network 13 on the pulse amplitude. Very long pulses will be sharpened by the expander and relatively unaffected by the frequency restrictive element while conversely very sharp pulses are relatively unaffected by the expander but are relatively broadened by the frequency restrictive circuit. The effect of the frequency restrictive element, therefore, will be more pronounced upon sharp pulses than upon broad ones, thus tending to stabilize the pulse length upon repeated traversals of the loop. In passing through the phase dispersive network the different frequency components of the pulse spectrum are phase shifted by different amounts. The corresponding result of this action when transformed to the time domain is a longer pulse in which the instantaneous frequency changes throughout the pulse. The sharpening action of the expander results in a pulse of broader frequency spectrum which has a reduced frequency sweep throughout the time of the pulse. The reduction in the frequency sweep is occasioned by the shorter pulse width. Since the rate at which the frequency is swept is unchanged the reduction in the pulse width provided by the expander results in a reduction of the range of frequency swept. The frequency restrictive circuit, in turn, acts to reduce the width of frequency spectrum of the pulse which results in an increase in the pulse length. Thus the pulse sharpening action of the expander is counter-balanced by the action of the phase dispersive network and the frequency restrictive circuit when the desired pulse shape is obtained at the output, and further modulation of the instantaneous frequency of the pulse is counter-balanced by the action of the expander to reduce the amount of frequency sweeping when the desired frequency-swept characteristics are obtained. This pulse generator is particularly suited to the generation of pulses which are linearly swept in frequency.

Since the pulse is amplified during each traversal, it is necessary to stabilize the ultimate pulse amplitude by the use of some form of gain control. An automatic gain control circuit 20 is shown by way of example in Fig. 1 as applied to the expander. Such automatic gain control may be equally well applied to the amplifier.

Although in the discussion of the block diagram given above, it has been assumed that a pulse is applied from an external source to initiate operation of the circuit, the circuit may be self-starting. Thus, if the circuit is suddenly actuated in the absence of external signals, as for example by the application of operating potentials to the amplifier and expanded circuits, the automatic gain control will operate to set the gain at a value greater than unity. Accordingly, thermal noise voltages will be amplified and applied to the dispersive network and then to the expander. The expander operation is such as to accentuate the highest noise peak by selectively amplifying this peak to a greater extent than the lower noise peaks, and, upon repeated traversal of the loop, this accentuated pulse or peak will be regenerated and eventually override all other noise components present. This regenerative action will continue until the normal peak pulse amplitude is reached at which time the automatic gain control will come into operation to prevent any further increase in the amplitude of the circulating pulse. The frequency components of this noise generated pulse, as determined either by the inherent frequency characteristics of the various elements or by the introduction of a separate filter become frequency modulated or swept in traversing the dispersive element present in the loop. By successive traversals around the loop the pulse becomes modulated to a progressively greater degree until a balance is established between the frequency distributing characteristics of dispersive network 13 and the frequency concentrating characteristics of the expander 14.

Since the expander provides more gain to the highest noise peak than to any other noise peak, one peak will always be preferred over the others. If the initial noise voltages should include two peaks having exactly the same amplitude, additional noise occurring during the pulse build-up period will result in one of the peaks becoming slightly larger than the other so that it will be preferred on subsequent traversals.

Moreover, once the build-up period is passed and stable oscillation is achieved, should it be desired, the automatic gain control may be made fast acting so that the gain of the loop may be changed between pulses. In this manner the resulting pulse train can be amplitude modulated in a predetermined fashion.

For some applications, it is desirable to obtain rather long intervals between pulses. In such cases, the delay line required would be quite lengthy. To overcome this difficulty a gating circuit may be employed to gate periodically the pulses appearing at the output 16. Thus although the repetition rate of the pulses traversing the regenerative loop may be high the pulses occurring at the output of the gating circuit will have a much lower repetition rate. In the case of an amplitude modulated pulse train a simple gating circuit such as a properly biased diode may be employed to pass only the pulse of largest amplitude. In practice a divsion of five to one or more in the pulse repetition rate can thereby be obtained.

Although the operation of the block diagram of Fig. 1 has been described for use in arrangement for radio frequency pulse generation, it is understood that the invention is also applicable to arrangements which generate so-called direct current pulses, which in actuality are low frequency pulses. The nature of the pulses which may be circulated in a loop circuit of this type depends upon the frequency characteristics of the circuit. If the frequency characteristic, as determined either by the inherent frequency limitations of the various elements or by the introduction of a separate filter, is essentially that of a low-pass filter, so-called direct current pulses will circulate. If, on the other hand, the above-mentioned frequency characteristic is that of a high-pass filter, radio-frequency pulses will circulate in the circuit.

In addition, the feedback circuit may take any of a variety of forms. It may, for example, and as indicated in the block diagram of Fig. 1, include an actual loop circuit wherein the output of the amplifier is connected physically to the input thereof by a continuous circuit which includes the other elements of the apparatus. Alternatively, a reflex type of circuit may be employed wherein the output of the amplifier is applied to a transmission line and reflected therefrom to the input of the amplifier. This type of regenerative circuit is shown in my aforementioned patent.

It is further understood that the output 16 of Fig. 1 may either be transmitted as a frequency swept pulse or, alternately, as indicated by switch 17 may be applied to the input of second phase dispersive network 18 having dispersive characteristics which are substantially the inverse of the phase dispersive characteristics of the regenerative loop 10. When one of the frequency-modulated pulses is passed through this dispersive network the amount of phase shift imparted by the network varies over the range of frequencies contained in the pulse, different portions of the pulse, therefore, being at different frequencies are phase-shifted different amounts. By making the phase dispersive characteristics of network 18 inverse to the phase dispersive characteristic of the loop 10 the frequency components of the relatively long frequency-modulated pulse can be concentrated to give a short pulse of considerable amplitude. In this case, frequency-swept pulses are generated and circulate through the regenerative circuit at increased pulse length and decreased peak power. After generation and before they are delivered to the antenna the pulses are shortened by means of dispersive circuit 18, with a consequent increase in peak power. In terms more familiar to one skilled in the radar art, the pulses are generated at reduced "duty cycle," so that the peak power requirements are reduced and then the "duty cycle" is increased as the pulses pass from the regenerative circuit to the antenna. By concentrating the pulse energy in an extremely short interval of time substantially all of the frequency modulation is eliminated and the generator provides high-power constant-frequency pulses.

Analysis of the circuit described above shows that the pulse train generated may be described by the following equation:

$$G(t)=E\sum_{p=-\infty}^{p=\infty} e^{j2\pi f_0(t-pt_0)-\frac{4}{\tau^2}(t-pt_0)^2+jb(t-pt_0)^2-jp\theta} \qquad (1)$$

where

E is a constant multiplier equal to the quiescent voltage at zero time $j$ equals $[-1]^{1/2}$ $f_0$ is the center frequency or midband frequency of the pulse $t$ is a time parameter in seconds $p$ is an integer denoting a particular pulse $t_0$ is a time delay in seconds $\tau$ is the pulse length measured at $l$ neper points (−8.68 db)

$b$ is the frequency modulation coefficient equal to $-\pi$ times the rate of frequency change, and $\theta$ is a phase constant equal to the radio frequency phase precession between pulses. Radio frequency phase precession as used herein signifies the change in phase of the radio frequency signal from one pulse to another.

The first term of the exponent above indicates the presence of pulses of R.-F. energy of center frequency $f_0$. The second term describes the pulse envelope, which in this case is gaussian in shape with a pulse width of $\tau$ measured between $l$ neper points. The third term indicates that the pulse is frequency modulated at a linear rate. The final term indicates the presence of radio frequency phase precession. The amount of phase precession, as indicated, is $\theta$ radians per pulse.

Our present interest is with the frequency modulation term. It can be seen from this term that the instantaneous frequency of the pulse is swept linearly at a rate of $$\frac{1}{2\pi t}\frac{d}{dt}(bt^2)=\frac{b}{\pi}\text{ cycles/second}^2 \qquad (2)$$

It can also be shown that $$\frac{b}{\pi}=\frac{n-1}{n+1}\pi\frac{\gamma}{\left(\frac{2}{F}\right)^4+\gamma^2} \qquad (3)$$

where $n$ indicates a non-linear operation and is the power law of the expander

F is the bandwidth of the frequency restrictive network (measured at the $l$ neper points)

$\gamma$ is the square law component of the phase-frequency characteristic of the phase dispersive network.

Further, the pulse length is given by the equation:

$$\tau=\frac{4}{\pi F\sqrt{1-\frac{1}{n}}}\left[\frac{2\left(1+\frac{\gamma^2F^4}{16}\right)}{1+\sqrt{1+\frac{n\gamma^2F^4}{4(n+1)^2}}}\right]^{1/2} \qquad (4)$$

To obtain any appreciable advantage as a consequence of the use of frequency modulation of the pulses, the frequency swept in the pulse time should be large compared with the frequency spectrum of a pulse of the same length without frequency modulation. The spectrum which the above described pulse will have when $\gamma$ equals zero (that is, if no phase dispersive network is contained in the circuit) is gaussian in shape having a width of $1/\pi\tau$. Accordingly, a measure of the advantage of using frequency modulated pulses, which shall be referred to as FM advantage, is the ratio of the frequency swept in the pulse length to the spectrum width of the same pulse without frequency modulation. That is $$\text{FM advantage}=\frac{\frac{b\tau}{\pi}}{\frac{1}{\pi\tau}}=b\tau^2 \qquad (5)$$

An inspection of Equations 3 and 4 shows that the FM advantage can be increased by increasing the value of $\gamma F^2$. Thus by increasing the bandwidth of the regenerative loop which is determined by the characteristics of the frequency restrictive circuit, and increasing the square law component of the phase-frequency characteristics of the phase dispersive network the FM advantage can be maximized. Although it has been found that the use of a phase dispersive network whose phase shift characteristics vary as the square of the change in frequency is desirable for the generation of linearly modulated pulse, the invention is not limited to this case. By providing phase-shift characteristics which vary as some other power of the change in frequency the pulses become frequency modulated in a non-linear fashion.

It can be shown mathematically that the amount and character of the frequency modulation of the generated pulses is a function of the nature of the phase shift vs. frequency curve of the phase dispersive network. When this curve is substantially linear, as in the conventional wave guide, the amount of frequency modulation of the pulses is negligible. When the curve follows a square law characteristic, however the frequency modulation is linear. Moreover by increasing the rate of curvature of the phase-shift vs. frequency curve (that is, increasing $d^2\theta/df^2$) the amount of frequency modulation is increased. For a phase-shift vs. frequency curve, however, whose rate of curvature is greater than the rate of curvature of a square law curve a greater amount of frequency modulation is obtained at the expense of a loss in the linearity of the frequency modulation. Thus by regulating the nature of the phase-shift vs. frequency curve, which represents the phase dispersive characteristics of the regenerative loop the degree of linearity and amount of frequency modulation can be controlled.

Figure 2:
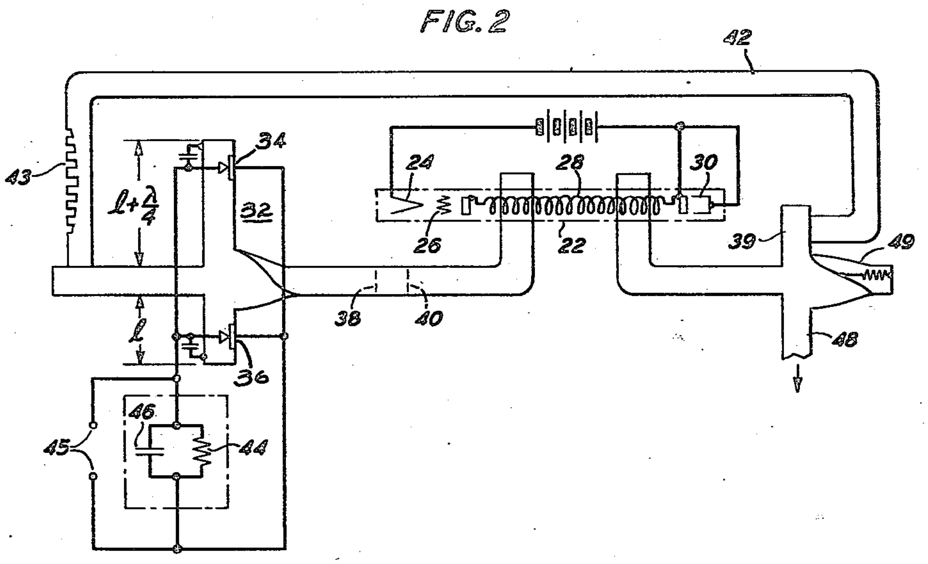
Fig. 2 is a schematic diagram illustrating a pulse generator for use at high frequencies.

Typically the use of a corrugated type phase dispersive network, as shown in Fig. 2 and described with reference to that figure subsequently, allows some regulation of its phase dispersive characteristics. This network can be designed to give substantially square law characteristics thereby providing linear frequency modulation, or higher order characteristics when a greater amount of modification is desired. Some advantage is also derived from this type dispersive network both in flexibility of design with respect to the aforementioned considerations and with respect to breadth of operating frequency since phase dispersion is obtained both near the low frequency and near high frequency cut-offs of the corrugated section. By circulating pulses containing frequency components near the low frequency cut-off of the corrugated section the phase vs. frequency characteristics will be the inverse of the characteristics obtained when operating near the high frequency cut-off of the section. Thus it is possible to operate the regenerative loop either in the range of the low frequency or high frequency cut-off of the corrugated section. A useful expedient is to operate the regenerative loop at a frequency near the low frequency cut-off of the corrugated section and to employ a corrugated section in the receiver having its high frequency cut-off at the operating frequency. The phase dispersive characteristics of the receiver will therefore be complementary to those of the generator and will act to demodulate the pulse thereby increasing its peak power. A further expedient is to generate pulses having frequency components which extend into the region of both the low and high frequency cut-offs of the corrugated section included in the regenerative loop, thus providing various distribution of frequency modulation in the generated pulses.

Although the bandwidth of the regenerative loop as shown in Fig. 1 is attributed entirely to the frequency restrictive circuit 16 as mentioned previously other elements of the loop will be found to possess frequency sensitive characteristics. In practice the phase dispersive network acts to restrict the bandwidth of the regenerative loop since phase dispersion is provided only over a limited frequency range near cut-off. A further advantage of the use of corrugated type dispersive networks is that several of these sections having different cut-off frequencies can be arranged in series thereby providing phase dispersion over a greater frequency range. As indicated above this increase in bandwidth also increases the FM advantage.

A specific circuit corresponding to the block diagram of Fig. 1 and arranged for the circulation of radio frequency pulses is illustrated in Fig. 2.

As has been pointed out above, the regenerative pulse generator of the invention may be used for the production of radio-frequency pulses if the frequency restrictive elements of the circuit are such as to correspond to a high-pass filter. A circuit for operation at a radio frequency of approximately 4,000 megacycles per second is illustrated in Fig. 2, wherein amplification is provided by a traveling wave amplifier tube 22 shown schematically as including a cathode 24, a control grid 26, a helix 28 and a target anode 30.

Traveling wave amplifiers are described in articles in Proceedings of the I. R. E. for February 1947 entitled "Traveling-wave tubes" by J. R. Pierce and L. M. Field at page 108; "Theory of the beam-type traveling-wave tube" by J. R. Pierce at page 111; and "The traveling wave tube as an amplifier at microwaves" by R. Kompfner at page 124.

In the present circuit the expander comprises a wave guide hybrid junction 32, two conjugate arms of which comprise input and output circuits and the remaining conjugate arms of which include crystal rectifiers 34 and 36, these latter arms being one-quarter wave different in length as indicated in the drawing. This type of expander forms the subject matter of my Patent 2,652,541, dated September 15, 1953. As pointed out in that application, if the crystals 34 and 36 are matched to the corresponding arms of the hybrid junction for low amplitude input signals, an expander characteristic may be obtained since signals of progressively greater amplitudes are more completely reflected by the progressively increasing mismatch between the crystals and the arms in which they are mounted. Since the expander has a limited bandwidth, a band-pass filter comprising irises 38 and 40 appropriately spaced in the wave guide is inserted in the circulating pulse path. The pulses from the expander are applied to the input coupling circuit of the traveling wave amplifier. The output of the amplifier is applied through a wave guide hybrid junction 39 to a transmission line 42 through which the pulses are applied to the input of the dispersive network 43 after a desired time delay. The dispersive network shown in Fig. 2 utilizes a section of hollow corrugated pipe. The section of hollow corrugated pipe 43 is interposed in a smooth wave guide line 42, for example, a cylindrical or rectangular pipe. One internal face of pipe 43 is provided with regularly spaced corrugations. The contour of the corrugations, which vary in depth, is tapered toward the ends of the section 43 for the purpose of impedance matching to the smooth wave guide 42. As described with reference to Fig. 1, the dispersive characteristics are made such as to provide the desired frequency sweeping of the pulses which are continuously traversing the regenerative loop. The pulses are then reapplied to the expander 32. After the desired frequency distribution is obtained further action of the dispersive network during subsequent pulse traversals is counterbalanced by the action of the expander to reduce the amount of frequency sweeping. The effect of the band-pass filter 38, 40 on the pulse length, like that of the phase dispersive network 43, is essentially to broaden the pulse applied to the input of the expander which again sharpens the pulse so that the pulse length is stabilized by the combined action of the filter, dispersive network, and expander. Automatic gain control action for the purpose of stabilizing the pulse amplitude at a desired peak pulse level is accomplished by the provision of a time constant circuit comprising a resistor 44 and a capacitor 46 connected in parallel in the direct current path of rectifiers 34 and 36. Thus, the rectifier impedances which vary with the unidirectional current therethrough and consequently the expander action of the expander 32 vary at a rate determined by the time constant circuit which limits the rate at which the rectifier impedance may change. Useful output of the pulse generator may be taken from branch 48 of wave guide hybrid junction 39.

Figure 3:
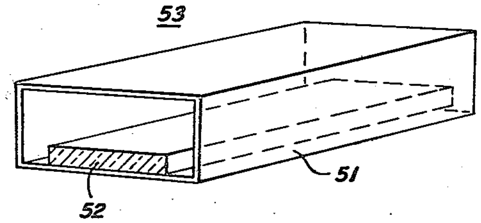
Fig. 3 shows an alternate embodiment of the phase dispersive network incorporated in the pulse generator of Fig. 2.

Fig. 3 illustrates an alternative phase dispersive network 53 which has phase-shift vs. frequency characteristics similar to the dispersive network 43 incorporated in the generator shown in Fig. 2 and which can be substituted therefor in this system. As shown in Fig. 3 this network includes a section of wave guide 51 which, for example, is rectangular in cross-section, and a slab of dielectric material 52 located within the wave guide section along an interior surface of the guide. The dielectric material may be titanium dioxide or other suitable material. At very high frequencies the wave energy is largely confined to the dielectric material 51 and travels at a velocity near $C/\sqrt{K}$ where C is the velocity of light and K the dielectric constant of the material. At lower frequencies where the dielectric thickness is a very small fraction of a wavelength, the wave travels in the space surrounding the dielectric and at a velocity near that of a normal wave guide, which may be near the velocity of light. Between the two conditions described there is a region of phase dispersal in which the various frequency components of the circulating pulse acquire a phase shift which is a function of the frequency of each.

Other type phase dispersive networks such as the use of two concentric helices suitably interposed between two sections of wave guide, as shown in French Patent 987,303 issued December 2, 1953, may be substituted for the dispersive network described above without departing from the scope of the invention. Although the system described has been found to be particularly effective with respect to the generation of pulses that are linearly swept in frequency it is understood as mentioned above, that the phase dispersive characteristics can be adjusted to provide other desired distributions of the frequency components. A variable phase dispersive network of the type shown in Fig. 40 of my Patent 2,659,817 issued November 17, 1953, may be employed. The phase dispersive characteristics of this network can be varied as a function of time in accordance with an applied signal. By varying the dispersive characteristics of the network as desired the frequency components of successive pulses can be arranged in different time sequential distributions. A receiver, responsive to a pulse train having successive pulses characterized by frequency distributions of the exact nature as those transmitted, would be required to detect and interpret the information contained in the generated pulses. This provides an effective measure of coding the generated pulse train.

It is understood that the above-described arrangements are illustrative of the application of the principles of the invention. Numerous other arrangements may be devised by those skilled in the art without departing from the spirit and scope of the invention.

What is claimed is:

1. An arrangement for producing a train of frequency swept pulses of desired amplitude and repetition rate comprising means forming a regenerative loop which has frequency restrictive characteristics defining a predetermined passband and a total delay equal to the interval desired between successive pulses, said loop being further characterized by non-linear phase dispersive characteristics throughout the loop passband and including amplifying means, and expanding means, serially connected in a regenerative loop, and means for controlling the gain of the loop to provide unity amplification to pulses of the desired amplitude.

2. An arrangement for producing a train of frequency swept pulses of desired amplitude and repetition rate comprising means forming a regenerative loop of desired frequency restrictive characteristics for defining a passband of said loop, said loop including serially connected a delay line of an electrical length sufficient to make the round trip delay equal to the desired pulse interval, means having non-linear phase dispersive characteristics throughout said loop passband, amplifying means, and expanding means, and means for controlling the gain of the loop to provide unity amplification for pulses of the desired amplitude.

3. Apparatus for producing pulses swept linearly in frequency and of desired characteristics comprising means forming a regenerative loop having a predetermined frequency passband which has a total delay equal to the interval desired between successive pulses, said means including means for maintaining a desired pulse shape, dispersive means whose phase-shift varies substantially as the square of the change in frequency throughout the loop passband for frequency sweeping said pulses, and means for providing amplification to maintain the unity loop gain for pulses of the desired peak amplitude.

4. Apparatus for producing frequency modulated pulses at a desired repetition rate comprising an amplifier and a circuit having a predetermined frequency passband for applying output signals therefrom to the input thereof after a total time delay equal to the pulse interval for the desired repetition rate, said circuit including a delay line, expander, and phase dispersive means having phase-shift vs. frequency characteristics such that the product of its phase-shift and the square of its bandwidth is greater than two throughout said circuit passband.

5. An arrangement for producing a train of frequency swept pulses of desired amplitude and repetition rate comprising means forming a regenerative loop which has frequency restrictive characteristics defining a predetermined passband and a total delay equal to the interval desired between successive pulses, said loop including phase dispersive means whose characteristics are such that the product of the square term of its phase-shift vs. frequency characteristic and the square of its passband is greater than two throughout the loop passband, amplifying means, and expanding means, all serially connected in a regenerative loop, and means for controlling the gain of the loop to provide unity amplification to pulses of the desired amplitude.

6. Apparatus for producing frequency swept pulses of desired characteristics comprising means forming a regenerative loop having a predetermined frequency passband which has a total delay equal to the interval desired between successive pulses, said means including means for maintaining a desired pulse shape, dispersive means including a section of corrugated wave guide characterized in that the second derivative of its phase-shift vs. frequency characteristic curve varies as a function of frequency throughout the loop passband for frequency-sweeping said pulses, and means for providing sufficient amplification to maintain unity loop-gain for pulses of the desired amplitude.

7. Apparatus for producing pulses linearly swept in frequency and of desired amplitude and repetition rate comprising means forming a regenerative loop which has frequency restrictive characteristics defining a predetermined passband and a total delay equal to the interval between successive pulses, said loop including a section of corrugated wave guide characterized by substantially square law phase-shift vs. frequency characteristics throughout the loop passband for frequency-sweeping said pulses, amplifying means, and expanding means, all serially connected in a regenerative loop, and means for maintaining the gain of said loop at unity amplification for pulses of the desired amplitude.

8. Apparatus for producing a train of pulses of desired amplitude and repetition rate comprising means forming a regenerative loop which has frequency restrictive characteristics defining a predetermined passband and a total delay equal to the interval desired between successive pulses, said loop including a network having non-linear phase dispersive characteristics throughout said loop passband comprising a section of wave guide having a strip of dielectric material positioned within and extending longitudinally along said wave guide in close proximity to its interior surface, amplifying means, and expanding means, serially connected in said regenerative loop, means coupled to said loop for controlling the loop gain to provide unity amplification for pulses of the desired amplitude, and a second network having non-linear phase dispersive characteristics throughout said loop passband for receiving the output pulses of said loop having phase-shift vs. frequency characteristic substantially the inverse of the phase-shift vs. frequency characteristics of the loop for demodulating the pulse train and peaking the energy contained in each pulse.

References Cited in the file of this patent

UNITED STATES PATENTS

| | | |
|---|---|---|
| 2,567,748 | White | Sept. 11, 1951 |
| 2,617,930 | Cutler | Nov. 11, 1952 |
| 2,627,574 | Feldman | Feb. 3, 1953 |
| 2,724,775 | Field | Nov. 22, 1955 |

OTHER REFERENCES

Publication: Proc. of I. R. E., vol. 41, pages 1602–1603, November 1952.